US008924195B2

(12) United States Patent
Kamatani et al.

(10) Patent No.: US 8,924,195 B2
(45) Date of Patent: Dec. 30, 2014

(54) APPARATUS AND METHOD FOR MACHINE TRANSLATION

(75) Inventors: Satoshi Kamatani, Kanagawa (JP);
Tetsuro Chino, Kanagawa (JP);
Kentaro Furihata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1511 days.

(21) Appl. No.: 12/234,009

(22) Filed: Sep. 19, 2008

(65) Prior Publication Data

US 2009/0222256 A1 Sep. 3, 2009

(30) Foreign Application Priority Data

Feb. 28, 2008 (JP) .................................. 2008-048284

(51) Int. Cl.
*G06F 17/28* (2006.01)
*G06F 17/20* (2006.01)
*G06F 17/27* (2006.01)

(52) U.S. Cl.
CPC ........ *G06F 17/2827* (2013.01); *G06F 17/2809* (2013.01); *G06F 17/2872* (2013.01); *G06F 17/2836* (2013.01)
USPC ................ 704/2; 704/4; 704/5; 704/7; 704/8; 704/9

(58) Field of Classification Search
CPC .............. G06F 17/289; G06F 17/2836; G06F 17/2854; G06F 17/2827
USPC ...................................... 704/1–10
See application file for complete search history.

(56) References Cited

U.S. PATENT DOCUMENTS 5,675,707 A * 10/1997 Gorin et al. .................. 704/257
5,867,811 A * 2/1999 O'Donoghue .................... 704/1
5,907,821 A * 5/1999 Kaji et al. ........................ 704/4

(Continued)

FOREIGN PATENT DOCUMENTS

JP 04241543 A * 8/1992 ............. H04L 29/06
JP 2000-10974 1/2000

OTHER PUBLICATIONS

Keiji Yasuda, Fumiaki Sugaya, Toshiyuki Takezawa, Seiichi Yamamoto, and Masuzo Yanagida. 2003. Applications of automatic evaluation methods to measuring a capability of speech translation system. In Proceedings of the tenth conference on European chapter of the Association for Computational Linguistics—vol. 1 (EACL '03), vol. 1. Association for.*

(Continued)

*Primary Examiner* — Matthew Baker
(74) *Attorney, Agent, or Firm* — Finnegan, Henderson, Farabow, Garrett & Dunner, L.L.P.

(57) ABSTRACT

In a machine-translation apparatus, an example storage unit stores therein target language examples in a target language and source language examples in a source language, while keeping the target language examples and the source language examples in correspondence with one another. An input receiving unit receives an input sentence in the source language. A searching unit conducts a search in the example storage unit for one of the target language examples corresponding to one of the source language examples that either matches or is similar to the input sentence. A translating unit generates a reverse-translated sentence by translating the one of the target language examples found in the search into the source language. A detecting unit detects a difference portion between the reverse-translated sentence and the input sentence. An output unit outputs the difference portion.

12 Claims, 13 Drawing Sheets

(56) References Cited

U.S. PATENT DOCUMENTS

| | | | |
|---|---|---|---|
| 6,266,642 B1* | 7/2001 | Franz et al. | 704/277 |
| 6,275,789 B1* | 8/2001 | Moser et al. | 704/7 |
| 6,278,968 B1* | 8/2001 | Franz et al. | 704/3 |
| 6,278,969 B1* | 8/2001 | King et al. | 704/7 |
| 6,341,372 B1* | 1/2002 | Datig | 717/136 |
| 6,345,243 B1* | 2/2002 | Clark | 704/2 |
| 6,345,244 B1* | 2/2002 | Clark | 704/2 |
| 6,598,021 B1* | 7/2003 | Shambaugh et al. | 704/270 |
| 6,782,356 B1* | 8/2004 | Lopke | 704/5 |
| 6,996,518 B2* | 2/2006 | Jones et al. | 704/8 |
| 7,107,206 B1* | 9/2006 | Uchida et al. | 704/2 |
| 7,212,964 B1* | 5/2007 | Alshawi et al. | 704/10 |
| 7,283,949 B2* | 10/2007 | Shieh | 704/4 |
| 7,349,839 B2* | 3/2008 | Moore | 704/2 |
| 7,447,623 B2* | 11/2008 | Appleby | 704/2 |
| 7,467,081 B2* | 12/2008 | Alshawi et al. | 704/10 |
| 7,519,528 B2* | 4/2009 | Liu et al. | 704/2 |
| 7,848,915 B2* | 12/2010 | Gao et al. | 704/2 |
| 7,890,330 B2* | 2/2011 | Ozkaragoz et al. | 704/266 |
| 8,060,358 B2* | 11/2011 | He et al. | 704/2 |
| 8,073,683 B2* | 12/2011 | Alshawi et al. | 704/10 |
| 8,185,372 B2* | 5/2012 | Sumita | 704/2 |
| 8,380,504 B1 | 2/2013 | Peden et al. | 704/246 |
| 2002/0111789 A1* | 8/2002 | Hull | 704/4 |
| 2002/0143542 A1* | 10/2002 | Eide | 704/260 |
| 2005/0137854 A1* | 6/2005 | Cancedda et al. | 704/9 |
| 2006/0217964 A1 | 9/2006 | Kamatani et al. | |
| 2006/0224378 A1 | 10/2006 | Chino et al. | |
| 2006/0229876 A1* | 10/2006 | Aaron et al. | 704/263 |
| 2007/0118352 A1* | 5/2007 | Alshawi et al. | 704/2 |
| 2007/0124131 A1 | 5/2007 | Chino et al. | |
| 2007/0198245 A1 | 8/2007 | Kamatani et al. | |
| 2008/0077391 A1 | 3/2008 | Chino et al. | |
| 2008/0195372 A1* | 8/2008 | Chin et al. | 704/2 |
| 2008/0228464 A1* | 9/2008 | Al-Onaizan et al. | 704/3 |
| 2008/0270140 A1* | 10/2008 | Hertz et al. | 704/267 |
| 2009/0043583 A1* | 2/2009 | Agapi et al. | 704/260 |
| 2009/0083037 A1* | 3/2009 | Gleason et al. | 704/260 |
| 2009/0112573 A1* | 4/2009 | He | 704/4 |
| 2009/0216963 A1* | 8/2009 | Greiner et al. | 711/153 |
| 2009/0326913 A1* | 12/2009 | Simard et al. | 704/2 |
| 2010/0268539 A1* | 10/2010 | Xu et al. | 704/260 |
| 2010/0274552 A1* | 10/2010 | Gao et al. | 704/2 |

OTHER PUBLICATIONS

Keiji Yasuda, Eiichiro Sumita, Genichiro Kikui, Sei-ichi Yamamoto, and Masuzo Yanagida. 2003. Real-time evaluation architecture for MT using multiplebackward translations. In Proceedings of Recent Ad-vances in Natural Language Processing (RANLP-2003), pp. 518-522.*

Kenji Imamura, Hideo Okuma and Eiichiro Sumita. Practical Approach to Syntax-based Statistical Machine Translation. In Proc. of Machine Translation Summit X. 2005.*

Chino, T. et al., "Apparatus, Method, and Computer Program Product for Machine Translation," U.S. Appl. No. 12/050,521, filed Mar. 18, 2008.

Kamatani, S. et al., "Apparatus, Method, and Computer Program Product for Machine Translation," U.S. Appl. No. 12/050,563, filed Mar. 18, 2008.

* cited by examiner

FIG.2

| | |
|---|---|
| 201 | 私は映画が好きです ～207 |
| | 我喜欢看电影 ～208 |
| | I love to watch movies. ～209 |
| 202 | 私は牛乳が好きです |
| | 我喜欢喝牛奶 |
| | I love to drink milk. |
| 203 | 私はラーメンが好きです |
| | 我喜欢吃面条 |
| | I love to eat Chinese noodles. |
| 204 | ノートを忘れないでね |
| | 请不要忘记买一本笔记本 |
| | Don't forget to buy a notebook. |
| 205 | 財布を忘れないでね |
| | 请不要遗忘钱包 |
| | Don't forget the wallet. |
| 206 | 私を忘れないでね |
| | 请不要忘记我 |
| | Don't forget me. |

FIG.3

| | | |
|---|---|---|
| 301 | 私は牛乳が好きです | 304 |
| | 我喜欢喝牛奶 | 305 |
| | I love to drink milk. | 306 |
| 302 | 私はラーメンが好きです | |
| | 我喜欢吃面条 | |
| | I love to eat Chinese noodles. | |
| 303 | 私は映画が好きです | |
| | 我喜欢看电影 | |
| | I love to watch movies. | |

FIG.4

| | | |
|---|---|---|
| | 私はお酒が好きです　411　412 | 401 |
| PARALLEL TRANSLATION EXAMPLE SET 402 | 私は映画が好きです | 403 |
| | 我喜欢看电影 | 404 |
| | I love to watch movies. | |
| | 我喜欢看酒 | 405 |
| | I love to watch liquor. | |
| | 私はお酒を見るのが好きです | 406 |
| | 413 | |

FIG.5

PARALLEL TRANSLATION EXAMPLE SET 504

- 501: 切手を忘れないでね (511)
- 502:
  - 请不要粘贴邮票
  - Don't forget to put a stamp.
- 503: 切手を貼るのを忘れないでね (512)
- 505: ノートを忘れないでね
- 506:
  - 请不要忘记买一本笔记本
  - Don't forget to buy a notebook.
- 507:
  - 请不要忘记买邮票
  - Don't forget to buy a stamp.
- 508: 切手を買うのを忘れないでね
- 513

FIG.6

| 601 | (私はお酒)を飲むの (が好きです) 602 | 603 | 私は牛乳が好きです |
| --- | --- | --- | --- |
| | | | 我喜欢喝牛奶 |
| | | | I love to drink milk. |
| 604 | (私はお酒)を食べるの (が好きです) 605 | 606 | 私はラーメンが好きです |
| | | | 我喜欢吃面条 |
| | | | I love to eat Chinese noodles. |
| 607 | (私はお酒)を見るの (が好きです) 608 | 609 | 私は映画が好きです |
| | | | 我喜欢看电影 |
| | | | I love to watch movies. |

FIG.19

| |  |
|---|---|
| | ノートを忘れないでね |
| 2101 | 请不要忘记买一本笔记本 |
| | Don't forget to buy a notebook. |
| | 財布を忘れないでね |
| 2102 | 请不要遗忘钱包 |
| | Don't forget the wallet. |
| | 私を忘れないでね |
| 2103 | 请不要忘记我 |
| | Don't forget me. |

FIG.20

| | |
|---|---|
| 请不要买一张邮票。 | 2201 |
| Don't forget to buy a stamp. | 2202 |
| 请不要粘贴邮票。 | 2203 |
| Don't forget to put a stamp. | 2204 |

FIG.21

| (切手)を買うの<br>(を忘れないでね) | ノートを忘れないでね |
| --- | --- |
| | 请不要忘记买一本笔记本 |
| | Don't forget to buy a notebook. |
| (切手)を持って行くの<br>(を忘れないでね) | 財布を忘れないでね |
| | 请不要遗忘钱包 |
| | Don't forget the wallet. |
| (切手)のこと<br>(を忘れないでね) | 私を忘れないでね |
| | 请不要忘记我 |
| | Don't forget me. |

FIG.22

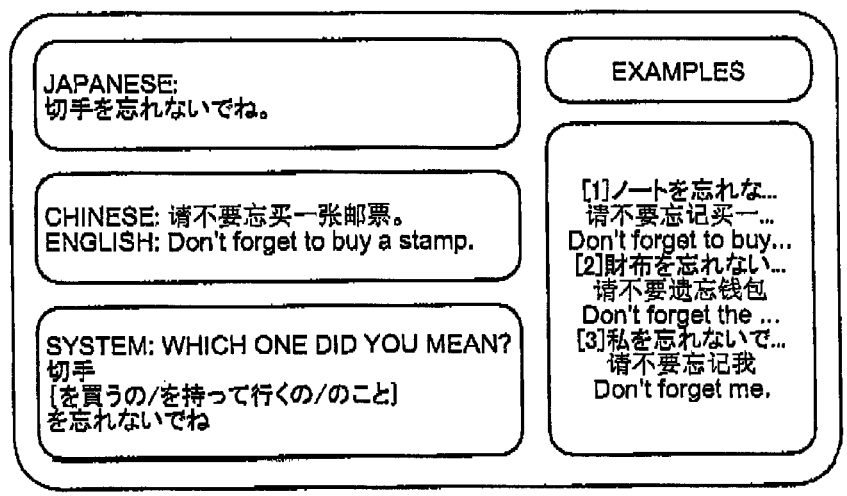

JAPANESE:
切手を忘れないでね。

CHINESE: 请不要忘记买一张邮票。
ENGLISH: Don't forget to buy a stamp.

SYSTEM: WHICH ONE DID YOU MEAN?
切手
[を買うの/を持って行くの/のこと]
を忘れないでね

EXAMPLES

[1]ノートを忘れな...
请不要忘记买一...
Don't forget to buy...
[2]財布を忘れない...
请不要遗忘钱包
Don't forget the ...
[3]私を忘れないで...
请不要忘记我
Don't forget me.

APPARATUS AND METHOD FOR MACHINE TRANSLATION

CROSS-REFERENCE TO ELATED APPLICATIONS

This application is based upon and claims the benefit of priority from the prior Japanese Patent Application No. 2008-48284, filed on Feb. 28, 2008; the entire contents of which are incorporated herein by reference.

BACKGROUND OF THE INVENTION

1. Field of the Invention

The present invention relates to a machine-translation apparatus and a machine-translation method for translating a sentence in a source language that has been input into a sentence in a target language.

2. Description of the Related Art

As natural language processing technology advances, machine-translation apparatuses that receive an input of a source-language sentence expressed in a source language, convert the input sentence into a sentence in a desired target language, and output the result of the conversion have been developed. For example, a machine-translation apparatus that translates a text or the like expressed in Japanese into another language such as English or Chinese has been in practical use. To translate the input sentence in the source language more faithfully with a higher level of precision, such a machine-translation apparatus needs to include a mechanism that is able to find a sufficient solution for the diversity and the ambiguity of natural languages.

For example, JP-A 2000-10974 (KOKAI) proposes a technique by which a case element that is missing in a sentence in a source language is supplementarily provided through an interaction with the user. This technique realizes a translating apparatus that offers a solution for the ambiguity that arises during the interpretation of the source language sentence and achieves a high level of precision without making analysis errors.

However, there are some situations in which, even if a source language sentence has no analytical ambiguity, the translating apparatus is not able to generate a translated sentence that sufficiently reflects the implied intention of the source language sentence. For example, any source language has certain words or phrases that are usually omitted due to a cultural background, the diction, or the pragmatics. It is often the case that omitting such words or phrases causes no grammatical problem in the source language. Thus, it is difficult to detect the situation in which, when a source language sentence that involves omission of such words or phrases has been translated, the translated sentence does not properly reflect the implied intention of the source language sentence.

In addition, generally speaking, users of machine-translation apparatuses do not usually have sufficient knowledge of the target language. Thus, it is extremely difficult for the users to check the translated sentence that has been output by the apparatus so as to determine that the translated sentence does not properly reflect the user's intention and to further input a source language sentence again with supplementary information for obtaining a more appropriate translated sentence.

SUMMARY OF THE INVENTION

According to one aspect of the present invention, a machine-translation apparatus includes an example storage unit that stores target language examples in a target language and source language examples in a source language in correspondence with one another, each of the target language examples having a meaning equivalent to a meaning of a corresponding one of the source language examples; an input receiving unit that receives an input sentence in the source language; a searching unit that conducts a search in the example storage unit for one of the target language examples corresponding to one of the source language examples that either matches or is similar to the input sentence; a translating unit that generates a target language sentence by translating the input sentence into the target language, and generates a reverse-translated sentence by translating the one of the target language examples found in the search into the source language; a detecting unit that detects difference portions between the reverse-translated sentence and the input sentence; and an output unit that outputs the difference portions.

According to another aspect of the present invention, a machine-translation apparatus includes an example storage unit that stores target language examples in a target language and source language examples in a source language in correspondence with one another, each of the target language examples having a meaning equivalent to a meaning of a corresponding one of the source language examples; an input receiving unit that receives an input sentence in the source language; a searching unit that conducts a search in the example storage unit for one of the target language examples corresponding to one of the source language examples that either matches or is similar to the input sentence; a first translating unit that generates a first reverse-translated sentence by translating the one of the target language examples found in the search into the source language; a second translating unit that generates a target language sentence by translating the input sentence into the target language, and generates a second reverse-translated sentence by translating the generated target language sentence into the source language; a detecting unit that detects a difference portion between the first reverse-translated sentence and the second reverse-translated sentence; and an output unit that outputs the difference portion.

According to still another aspect of the present invention, a machine-translation method includes receiving an input sentence in a source language; conducting a search in an example storage unit that stores target language examples in a target language and source language examples in the source language in correspondence with one another, each of the target language examples having a meaning equivalent to a meaning of a corresponding one of the source language examples, for one of the target language examples corresponding to one of the source language examples that either matches or is similar to the input sentence; generating a target language sentence by translating the input sentence into the target language; generating a reverse-translated sentence by translating the one of the target language examples found in the search into the source language; detecting a difference portion between the reverse-translated sentence and the input sentence; and outputting the difference portion.

According to still another aspect of the present invention, a machine-translation method includes receiving an input sentence in a source language; conducting a search in an example storage unit that stores target language examples in a target language and source language examples in the source language in correspondence with one another, each of the target language examples having a meaning equivalent to a meaning of a corresponding one of the source language examples, for one of the target language examples corresponding to one of the source language examples that either matches or is similar to the input sentence; generating a first reverse-translated sentence by translating the one of the target language examples found in the search into the source language; generating a target language sentence by translating the input sentence into the target language and generating a second reverse-translated sentence by translating the generated target language sentence into the source language; detecting a difference portion between the first reverse-translated sentence and the second reverse-translated sentence; and outputting the difference portion.

BRIEF DESCRIPTION OF THE DRAWINGS

FIG. 2 is a drawing illustrating an exemplary data structure of parallel translation example sets that are stored in an example storage unit;

FIG. 3 is a drawing illustrating an example of a similar parallel translation example list;

FIG. 4 is a drawing for explaining a process for detecting a difference between a source language input sentence and an edited example reverse-translated sentence;

FIG. 5 is a drawing for explaining a process for detecting a difference between a reverse-translated input sentence and an edited example reverse-translated sentence;

FIG. 6 is a drawing illustrating an example of a difference information list that stores difference information therein;

FIG. 19 is a drawing illustrating an example of a similar parallel translation example list;

FIG. 20 is a drawing illustrating examples of translated sentences;

FIG. 21 is a drawing illustrating an example of a difference information list;

FIG. 22 is a drawing illustrating an example of a display screen;

DETAILED DESCRIPTION OF THE INVENTION

Exemplary embodiments of a machine-translation apparatus and a machine-translation method according to the present invention will be explained in detail, with reference to the accompanying drawings. In the following sections, the present invention will be explained by using examples of translations between Japanese and Chinese languages or between Japanese and English languages. However, the languages that can be used as the target language in the translating process are not limited to these languages. It is acceptable to use any other languages.

A machine-translation apparatus according to an embodiment of the present invention conducts a search for a parallel translation example set including an example that is similar to an input sentence in a source language, detects a difference portion (i.e., a difference) by comparing a reverse-translated sentence obtained by translating the target language example in the parallel translation example set into the source language with the input sentence or with another reverse-translated sentence obtained by translating a result of translation of the input sentence into the target language further into the source language, and outputs the detected difference.

Figure 1:
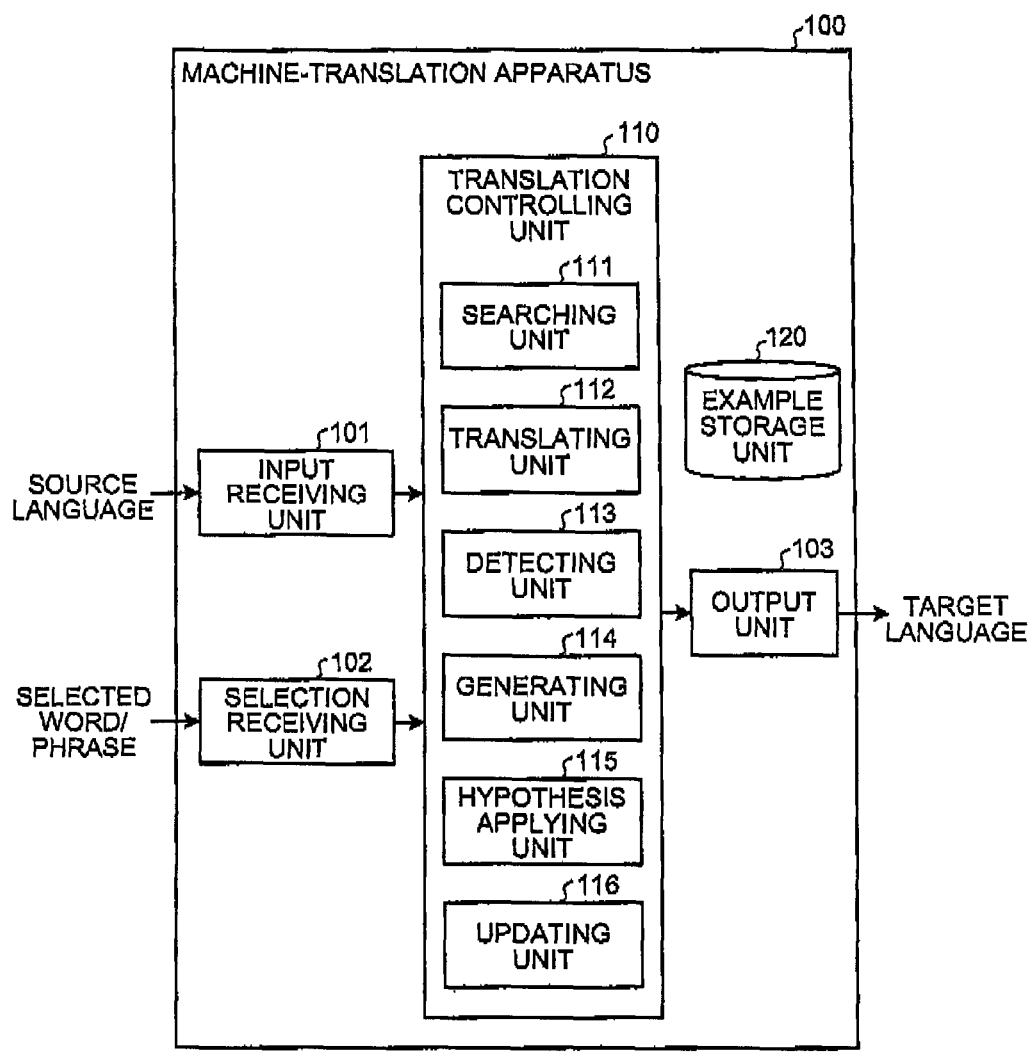
FIG. 1 is a block diagram of a machine-translation apparatus according to an embodiment of the present invention.

As shown in FIG. 1, a machine-translation apparatus 100 includes: an input receiving unit 101; a selection receiving unit 102; a translation controlling unit 110; an output unit 103; and an example storage unit 120. The translation controlling unit 110 is a constituent element that controls a translating process and includes a searching unit 111, a translating unit 112, a detecting unit 113, a generating unit 114, a hypothesis applying unit 115, and an updating unit 116. Next, the functions of each of the constituent elements will be explained in detail.

The input receiving unit 101 receives an input sentence in a source language provided by a user (hereinafter, the "source language input sentence"). To input the source language input sentence, it is acceptable to use any of the commonly-used input means such as keyboards, pointing devices, hand-written character recognizing devices, and Optical Character Readers (OCRs). The input receiving unit 101 may use any method as long as it is possible to perform a process so as to eventually obtain the source language input sentence. For example, an arrangement is acceptable in which the input receiving unit 101 receives an utterance of the user as a speech input and outputs the source language input sentence as a result of a speech recognition process performed on the input.

The example storage unit 120 stores therein parallel translation example sets each of which is a set made up of a sentence in the source language and a sentence in at least one target language, the sentence in the source language being a translation of the sentence in the target language, and vice versa. In the description of the present embodiment, an example is used in which each of the parallel translation example sets includes examples in Japanese, Chinese, and English that are kept in correspondence with one another. The number of languages in which the examples are kept in correspondence with one another does not have to be three. In other words, another arrangement is acceptable in which examples in two languages or in four or more languages are kept in correspondence with one another. In the case where examples in three or more languages are used, an arrangement can be made so that the user is able to dynamically select the desired target language.

In FIG. 2, an example is shown in which six parallel translation example sets (i.e., parallel translation example sets 201 to 206) are stored. Each of the parallel translation example sets 201 to 206 contains examples in a plurality of languages. For example, the parallel translation example set 201 contains a Japanese sentence 207, a Chinese sentence 208, and an English sentence 209, each of the sentences being a parallel translation of the other sentences.

In the explanation below, of the example sentences in each of the parallel translation example sets, the sentence that is in the same language as the one in which the source language input sentence received by the input receiving unit 101 is expressed will be referred to as an "example source sentence", whereas the sentence that is in the language specified as the target language for the translation will be referred to as an "example translated sentence".

The example storage unit 120 may be configured with any of the commonly-used storage media such as Hard Disk Drives (HDDs), optical disks, memory cards, and Random Access Memories (RAMs).

Returning to the description of FIG. 1, the searching unit 111 conducts a search in the example storage unit 120 for parallel translation example sets each containing an example source sentence that is similar to the source language input sentence received by the input receiving unit 101. The searching unit 111 further stores the parallel translation example sets into a similar parallel translation example list, while arranging them in an order according to their similarity levels. To calculate the similarity levels of the parallel translation example sets, it is acceptable to use any of the methods that have conventionally been used, such as a method by which the distance between words is measured within a thesaurus that describes the conceptual superordinate/subordinate relationships and the synonym relationships of the words.

For example, the searching unit 111 uses an index that has the largest value when words in question completely match, as a word-to-word similarity level that indicates the level of similarity between the words. Further, the searching unit 111 detects word-to-word correspondences that make the word-to-word similarity levels of the entire sentence the largest, by using any of the methods that are widely known, such as the dynamic programming method. Furthermore, the searching unit 111 uses the total of the word-to-word similarity levels that are obtained by hypothetically using the detected word-to-word correspondences, as the similarity level of the entire sentence. Thus, by conducting the search, the searching unit 111 finds a predetermined number of parallel translation example sets in descending order of the similarity levels of the entire sentences.

FIG. 3 is a drawing illustrating an example of the similar parallel translation example list that stores therein the results of the process performed by the searching unit 111. As shown in FIG. 3, the similar parallel translation example list stores therein some of the parallel translation example sets shown in FIG. 2 that have been found in the search as the examples that are similar to the source language input sentence, while having them arranged in the order according to their similarity levels. Shown in FIG. 3 is an example of the similar parallel translation example list that stores therein parallel translation example sets 301, 302, and 303 that respectively correspond to the parallel translation example sets 202, 203, and 201 shown in FIG. 2.

Returning to the description of FIG. 1, in the case where a specified character string represents a sentence in the source language, the translating unit 112 translates the sentence into a sentence in the target language, and in the case where the specified character string represents a sentence in the target language, the translating unit 112 translates the sentence into a sentence in the source language, before outputting the translated sentence. For example, in the case where the target language is Chinese, and the specified character string represents a Japanese sentence, the translating unit 112 translates the Japanese sentence into a Chinese sentence. On the other hand, in the case where the specified character string represents a Chinese sentence, the translating unit 112 translates the Chinese sentence into a Japanese sentence.

According to the present embodiment, in response to a request from the detecting unit 113, which is explained later, the translating unit 112 generates an edited example reverse-translated sentence by translating, into the source language, an edited example translated sentence (which is explained later in detail) that is obtained by editing an example translated sentence. Also, in response to a request from the detecting unit 113, the translating unit 112 generates a target language sentence by translating the source language input sentence into the target language, and also generates a reverse-translated input sentence by translating the generated target language sentence into the source language. The edited example reverse-translated sentence is referred to when the detecting unit 113 detects a difference between the edited example reverse-translated sentence and the source language input sentence or a difference between the edited example reverse-translated sentence and the reverse-translated input sentence.

The translating process performed by the translating unit 112 may employ any of the machine-translation methods that have conventionally been used, such as the transfer method, the example-based method, the statistics-based method, and the interlingual method.

The detecting unit 113 detects the difference between the edited example reverse-translated sentence and the source language input sentence, as well as the difference between the edited example reverse-translated sentence and the reverse-translated input sentence. More specifically, first, the detecting unit 113 detects the difference between the source language input sentence and each of example source sentences included in the parallel translation example sets stored in the similar parallel translation example list that has been structured by the searching unit 111. After that, the detecting unit 113 generates an edited example translated sentence by replacing the words in the example translated sentence that correspond to the words in the example source sentence exhibiting the difference, with translations of the words in the source language input sentence exhibiting the difference. Further, the detecting unit 113 obtains the edited example reverse-translated sentence by causing the translating unit 112 to translate the edited example translated sentence into the source language. After that, the detecting unit 113 detects the difference between the edited example reverse-translated sentence and the source language input sentence. The detecting unit 113 then stores difference information including the detected difference into a difference information list, while the parallel translation example set used in the comparison process is kept in correspondence with the difference information.

Also, the detecting unit 113 obtains a target language sentence by causing the translating unit 112 to translate the source language input sentence into the target language. Further, the detecting unit 113 obtains the reverse-translated input sentence by causing the translating unit 112 to further translate the target language sentence into the source language. After that, the detecting unit 113 detects the difference between the edited example reverse-translated sentence and the reverse-translated input sentence. The detecting unit 113 then stores difference information including the detected difference into the difference information list, while the parallel translation example set used in the comparison process is kept in correspondence with the difference information.

Next, a specific example of the difference detecting process performed by the detecting unit 113 will be explained. FIG. 4 is a drawing illustrating an example of the difference detecting process performed on a source language input sentence 401 that has been input in Japanese to express the meaning of "I love to drink liquor".

It should be noted that, in Japanese, when expressing such a meaning, it is possible to omit the verb "nomu (meaning 'to drink')" that takes the object "osake (meaning 'liquor')" from the sentence. The source language input sentence 401 represents a Japanese sentence from which the verb "nomu (meaning 'to drink') has been omitted.

In this situation, for example, the searching unit 111 finds, as a result of a search, a parallel translation example set 402 that corresponds to the parallel translation example set 201 shown in FIG. 2. The parallel translation example set 402 includes the examples in the mutually different languages each of which means "I love to watch movies". It should be noted that the verb "miru" (meaning 'to watch') that takes the word "eiga" (meaning 'movies') as the object is omitted from the example source sentence 403 in Japanese that is included in the parallel translation example set 402.

Accordingly, as the difference between the source language input sentence 401 and the example source sentence 403, the detecting unit 113 detects the Japanese word "osake" 411 meaning "liquor" and the Japanese word "eiga" 412 meaning "movies". The detecting unit 113 then generates an edited example translated sentence 405 by replacing, within the example translated sentences 404, at least one of the underlined words meaning "movies" with the Chinese word or the English word meaning "liquor". In FIG. 4, the example translated sentence in Chinese and the example translated sentence in English are both shown; however, it is sufficient as long as the detecting unit 113 performs the difference detecting process on at least one of the example translated sentences that corresponds to the specified target language.

Subsequently, the detecting unit 113 generates an edited example reverse-translated sentence 406 by causing the translating unit 112 to further translate the edited example translated sentence 405. After that, the detecting unit 113 detects a difference 413 between the source language input sentence 401 and the edited example reverse-translated sentence 406 and stores difference information including the detected difference 413 into the difference information list, while the parallel translation example set 402 is kept in correspondence with the difference information.

FIG. 5 is a drawing illustrating an example of the difference detecting process performed on a source language input sentence 501 that has been input in Japanese to express the meaning of "Don't forget to put a stamp (i.e., a postage stamp)".

It should be noted that, in Japanese, when expressing such a meaning, it is possible to omit the verb "haru (meaning 'to put')" that takes the object "kitte (meaning 'a stamp') from the sentence. The source language input sentence 501 represents a Japanese sentence from which the verb "haru (meaning 'to put') has been omitted.

The detecting unit 113 obtains a target language sentence 502 by causing the translating unit 112 to translate the source language input sentence 501 into the target language. Further, the detecting unit 113 obtains a reverse-translated input sentence 503 by causing the translating unit 112 to further translate the target language sentence 502 into the source language.

On the other hand, as an example that is similar to the source language input sentence 501, the searching unit 111 finds, as a result of a search, a parallel translation example set 504 that corresponds to the parallel translation example set 204 shown in FIG. 2. The parallel translation example set 504 includes the examples in the mutually different languages each of which means "Don't forget to buy a notebook". It should be noted that the verb "kau (meaning 'to buy')" that takes the word "nooto (meaning 'notebook')" as the object is omitted from an example source sentence 505 in Japanese that is included in the parallel translation example set 504.

Accordingly, as the difference between the source language input sentence 501 and the example source sentence 505, the detecting unit 113 detects the Japanese word "kitte" 511 meaning "a stamp" and the Japanese word "nooto" 512 meaning "a notebook". The detecting unit 113 then generates an edited example translated sentence 507 by replacing, within the example translated sentences 506, at least one of the underlined words meaning "a notebook" with the Chinese word or the English word meaning "a stamp".

Subsequently, the detecting unit 113 generates an edited example reverse-translated sentence 508 by causing the translating unit 112 to further translate the edited example translated sentence 507. After that, the detecting unit 113 detects a difference 513 between the source language input sentence 501 and the edited example reverse-translated sentence 508 and stores difference information including the detected difference 513 into the difference information list, while the parallel translation example set 504 is kept in correspondence with the difference information.

FIG. 6 is a drawing illustrating an example of a difference information list that includes three pieces of difference information corresponding to parallel translation example sets, in a situation where a similar parallel translation example list including three parallel translation example sets as shown in FIG. 3 has been obtained. As shown in FIG. 6, the pieces of difference information 601, 604, and 607 are respectively kept in correspondence with the parallel translation example sets 603, 606, and 609 from which the differences 602, 605, and 608 have been detected respectively. Each of the pieces of difference information 601, 604, and 607 contains the phrases each of which is placed between the symbols "(" and ")" and that were originally included in the source language input sentence. With these arrangements, the user is able to easily understand the portions having the differences within the edited example reverse-translated sentences.

Returning to the description of FIG. 1, the generating unit 114 generates an output sentence by adding the detected difference to the source language input sentence. The output sentence is a sentence that is output for the user so as to suggest a candidate for a new source language sentence that includes supplementary information that is needed by the machine-translation apparatus to obtain the translation intended by the user. In the following explanation, such an output sentence will be referred to as a "suggested sentence".

Figure 7:
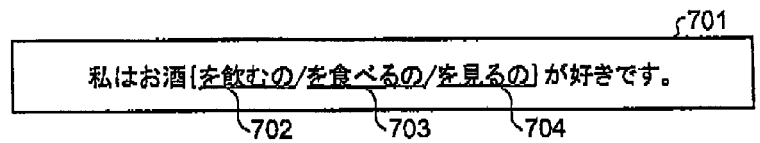
FIG. 7 is a drawing illustrating an example of a suggested sentence.

More specifically, the generating unit 114 generates the suggested sentence by disjunctively arranging the differences included in the difference information list into the position between the portions each of which is placed between the symbols "(" and ")" and that were originally included in the source language input sentence. As shown in FIG. 7, the generating unit 114 generates a suggested sentence 701 by embedding differences 702, 703, and 704 that are placed between the symbols "(" and ")" and are disjunctively arranged while being separated from one another by the symbols "/", into the portion of the source language input sentence that exhibits the difference. The suggested sentence 701 is an example of the suggested sentence that is generated by the generating unit 114 in the case where the difference information list as shown in FIG. 6 has been obtained with respect to the source language input sentence 401 as shown in FIG. 4.

Returning to the description of FIG. 1, the selection receiving unit 102 receives one of the differences selected by the user out of the suggested sentence that has been generated by the generating unit 114 and has been output by the output unit 103 (which is explained later). Also, the selection receiving unit 102 receives an operation performed by the user to end the translating process. For the selection receiving unit 102 to receive the selected difference and to receive the operation to end the translating process, any of the commonly-used input means such as keyboards and pointing devices may be used.

For example, by using a pointing device, the user selects one of the differences that he/she would like to choose by pointing to the portion that displays the difference 702 within the suggested sentence 701 that has been output as shown in FIG. 7. As a result, the selection receiving unit 102 receives the selected difference. The selection receiving unit 102 stores, as selected difference information, the piece of difference information 601 shown in FIG. 6 that includes the selected difference 702, into a storage unit or the like (not shown) such as a Random Access Memory (RAM).

Figure 8:
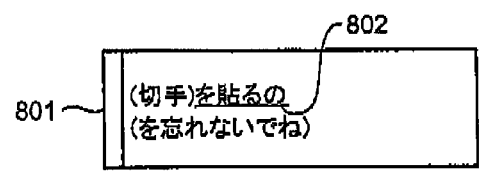
FIG. 8 is a drawing illustrating an example of user difference information.

In the case where the user wishes to supplement the source language input sentence with a word or a phrase that is other than the differences contained in the suggested sentence, the selection receiving unit 102 receives the word or the phrase that the user has input on his/her own as user difference information and stores the received user difference information into a storage unit. As shown in FIG. 8, in user difference information 801, the phrases each of which is placed between the symbols "(" and ")" and that were originally included in the source language input sentence are added to a difference 802 that represents the phrase that has been input by the user.

The user difference information is different from the difference information serving as the elements of the difference information list shown in FIG. 6 in that the parallel translation example set from which the difference has been detected is not kept in correspondence with the user difference information. However, the storing method that is employed for storing the difference information itself is common to the user difference information and the difference information. Thus, for both of the situations in which the user has selected one of the output differences and in which the user has input a difference on his/her own, the process to be performed is mutually the same.

Another arrangement is acceptable in which the selection receiving unit 102 is configured so as to receive a user's utterance as a speech input, perform a speech recognition process on the received speech, and receives a difference that matches the result of the speech recognition process as the selected difference. Yet another arrangement is acceptable in which, in the case where the user has uttered only a keyword being a part of a difference, the selection receiving unit 102 determines that the difference that includes the keyword has been selected.

The hypothesis applying unit 115 generates a new source language input sentence by using the selected difference information or the user difference information and obtains a new target language sentence by causing the translating unit 112 to translate the newly generated source language input sentence.

For example, in the case where the user has selected the difference 702 with respect to the suggested sentence 701 shown in FIG. 7, the piece of difference information 601 shown in FIG. 6 is stored as the selected difference information. In this situation, the hypothesis applying unit 115 generates a new source language input sentence by removing the symbols "(" and ")" from the piece of difference information 601. Also, based on the user difference information, the hypothesis applying unit 115 generates a new source language input sentence in the similar manner.

The updating unit 116 updates the positional arrangement so that the parallel translation example set that is kept in correspondence with the selected difference information is moved to the top of the similar parallel translation example list that has been generated by the searching unit 111.

The output unit 103 outputs the source language input sentence, the target language sentence, the suggested sentence, and the contents of the similar parallel translation example list. The outputting method used by the output unit 103 may be realized with any of the methods that have conventionally been used, such as an image output realized by a display device (not shown), a printed output realized by a printing device (not shown), a synthesized audio output realized by an audio synthesizing device (not shown). In addition, an arrangement is acceptable in which two or more of these outputting methods are incorporated into the machine-translation apparatus so that the outputting method to be used is changed as necessary. Another arrangement is acceptable in which two or more of these outputting methods are used in combination.

Figure 9:
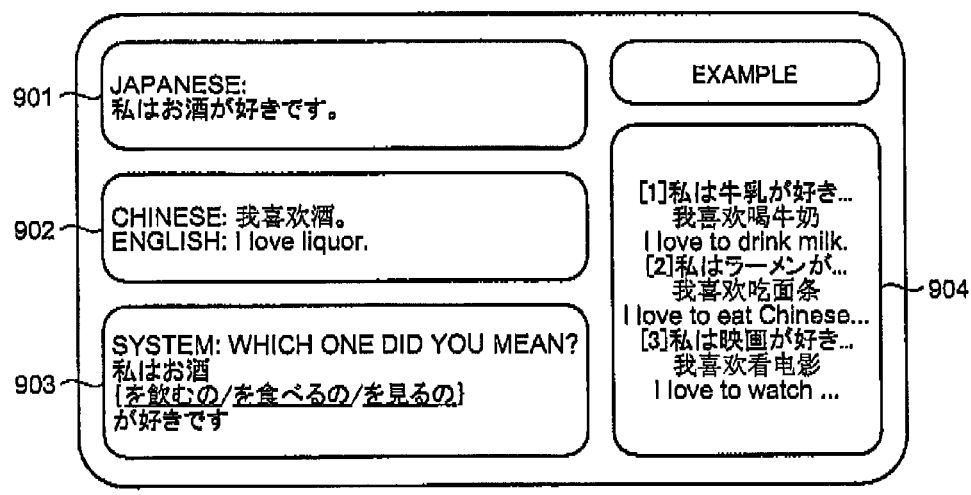
FIG. 9 is a drawing illustrating an example of a display screen.

As shown in FIG. 9, the display screen includes a source-language input sentence field 901 into which the source language input sentence is output; a target language sentence field 902 into which the target language sentence is output; a suggested sentence field 903 into which the suggested sentence is output; and a similar-parallel-translation example list field 904 into which the parallel translation example sets within the similar parallel translation example list are output.

Figure 10:
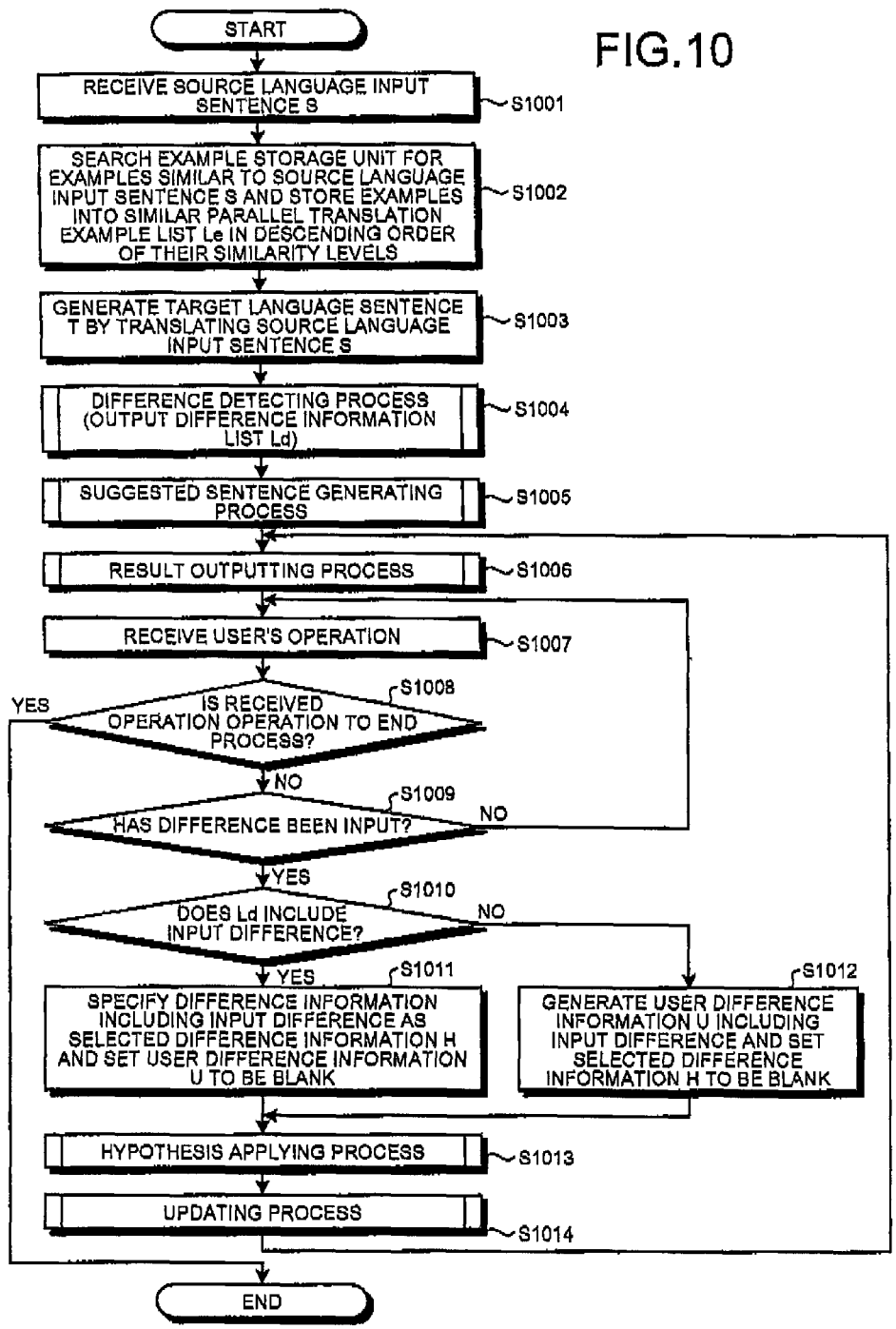
FIG. 10 is a flowchart of an overall procedure in a machine-translation process according to the embodiment.

Next, a machine-translation process performed by the machine-translation apparatus 100 according to the present embodiment configured as described above will be explained with reference to FIG. 10. First, the input receiving unit 101 receives a source language input sentence S (step S1001). Next, the searching unit 111 conducts a search in the example storage unit 120 for examples each of which matches or is similar to the source language input sentence S and stores the examples into a similar parallel translation example list Le in descending order of their similarity levels (step S1002).

After that, the translating unit 112 generates a target language sentence T by translating the source language input sentence S (step S1003). Further, the detecting unit 113 generates an edited example reverse-translated sentence and a reverse-translated input sentence and performs a difference detecting process to detect the difference by comparing the edited example reverse-translated sentence with the source language input sentence and with the reverse-translated input sentence (step S1004). The details of the difference detecting process will be explained later. As a result of the difference detecting process, a difference information list Ld including the detected difference is output.

After that, by referring to the detected difference, the generating unit 114 performs a suggested sentence generating process to generate a suggested sentence to be presented to the user (step S1005). The details of the suggested sentence generating process will be explained later.

Subsequently, the output unit 103 performs a result outputting process to output the source language input sentence, the target language sentence, and the generated suggested sentence to a display device or the like (step S1006). The details of the result outputting process will be explained later.

After that, the selection receiving unit 102 receives an operation of the user (step S1007). The selection receiving unit 102 then judges whether the received operation is an operation to end the process (step S1008). In the case where the received operation is an operation to end the process (step S1008: Yes), the machine-translation process is ended.

On the contrary, in the case where the received operation is not an operation to end the process (step S1008; No), the selection receiving unit 102 judges whether a difference has been input (step S1009). Examples of the method used for inputting the difference include a method by which the user selects the difference out of the displayed suggested sentence with a pointing device or the like and another method by which the user inputs, on his/her own, the difference that is not included in the suggested sentence.

In the case where no difference has been input (step S1009: No), the process returns to the user operation receiving process, so that the process is repeated (step S1007).

On the contrary, in the case where the difference has been input (step S1009: Yes), the hypothesis applying unit 115 judges whether the input difference is included in the difference information list that has been output as a result of the difference detecting process (step S1010). In the case where the input difference is included in the difference information list (step S1010; Yes), the hypothesis applying unit 115 stores, into a storage unit, the difference information that includes the input difference as selected difference information H, and also sets user difference information U to be blank (step S1011).

On the contrary, in the case where the input difference is not included in the difference information list (step S1010: No), the hypothesis applying unit 115 generates user difference information U that includes the input difference and stores the generated user difference information U into a storage unit. In addition, the hypothesis applying unit 115 sets the selected difference information H to be blank (step S1012).

After that, by referring to the selected difference information H or the user difference information U that has been stored, the hypothesis applying unit 115 performs a hypothesis applying process to generate a new source language input sentence and obtain a target language sentence by translating the newly generated source language input sentence (step S1013). The details of the hypothesis applying process will be explained later.

Subsequently, the updating unit 116 performs an updating process to update the display on the display screen (step S1014). The details of the updating process will be explained later.

As a result of the processes described above, it is possible to output the difference between the reverse-translated sentence obtained by re-translating the translation result into the source language and the source language input sentence, as the information used for detecting whether the translation result properly reflects the implied intention of the source language sentence. Accordingly, the machine-translation apparatus is able to translate the source language input sentence that is newly generated by using the difference selected by the user out of the output differences. Thus, the machine-translation apparatus is able to easily obtain a translation result that properly reflects the intention.

Figure 11:
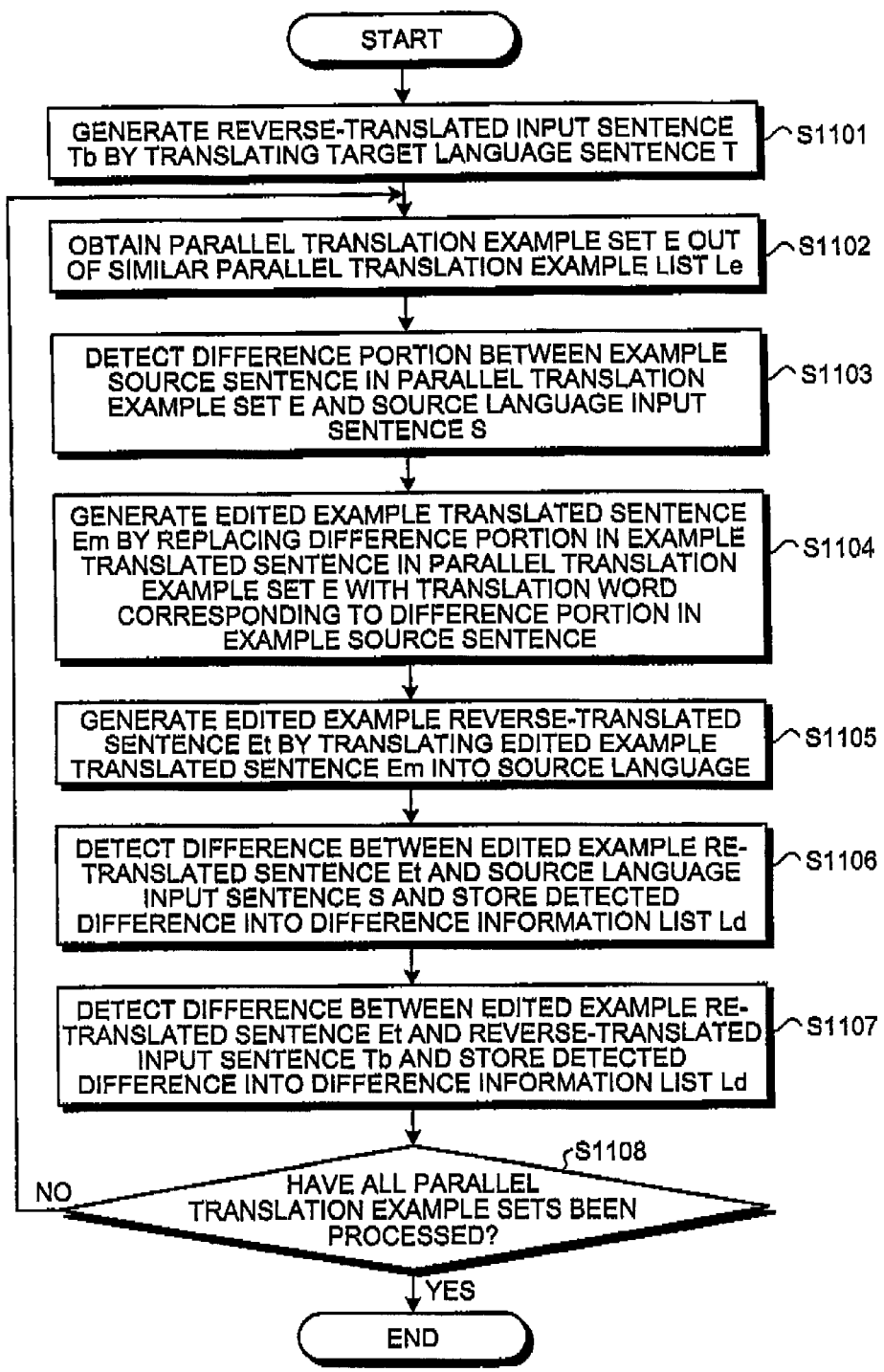
FIG. 11 is a flowchart of an overall procedure in a difference detecting process according to the embodiment.

Next, the details of the difference detecting process performed at step S1004 will be explained, with reference to FIG. 11.

First, the detecting unit 113 generates a reverse-translated input sentence Tb by causing the translating unit 112 to translate the target language sentence T into the source language (step S1101). After that, the detecting unit 113 obtains a parallel translation example set E that has not yet been processed out of the similar parallel translation example list Le (step S1102).

Subsequently, the detecting unit 113 detects the difference portion between the example source sentence in the obtained parallel translation example set E and the source language input sentence S (step S1103). Further, the detecting unit 113 generates an edited example translated sentence Em by replacing the word or the phrase that corresponds to the difference portion in the example translated sentence within the parallel translation example set E with a translation word/phrase that corresponds to the difference portion in the example source sentence (step S1104). In this situation, the detecting unit 113 obtains the translation word/phrase that corresponds to the difference portion in the example source sentence by referring to a dictionary (not shown) or the like that stores therein words in the source language and words in the target language while the words are kept in correspondence with one another.

After that, the detecting unit 113 generates an edited example reverse-translated sentence Et by causing the translating unit 112 to translate the edited example translated sentence Em into the source language (step S1105). Subsequently, the detecting unit 113 detects the difference between the edited example reverse-translated sentence Et and the source language input sentence S, generates difference information including the detected difference, and stores the generated difference information into the difference information list Ld (step S1106). More specifically, the detecting unit 113 generates the difference information in which the word or the phrase that is placed between the symbols "(" and ")" and that was originally included in the source language input sentence is added to the detected difference. Further, the detecting unit 113 stores the generated difference information into the difference information list Ld, while the parallel translation example set out of which the difference was detected is kept in correspondence with the generated difference information.

Similarly, the detecting unit 113 detects the difference between the edited example reverse-translated sentence Et and the reverse-translated input sentence Tb that has been generated at step S1101, generates difference information that includes the detected difference, and stores the generated difference information into the difference information list Ld (step S1107).

After that, the detecting unit 113 judges whether all the parallel translation example sets in the similar parallel translation example list Le have been processed (step S1108). In the case where all the parallel translation example sets have not been processed (step S1108: No), the detecting unit 113 selects the next parallel translation example set and repeats the process (step S1102). On the contrary, in the case where all the parallel translation example sets have been processed (step S1108: Yes), the difference detecting process ends.

Figure 12:
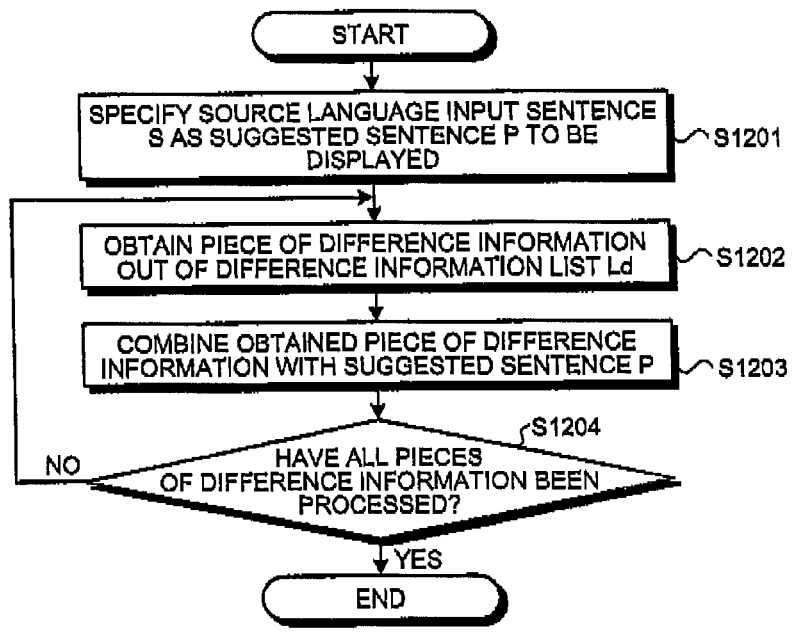
FIG. 12 is a flowchart of an overall procedure in a suggested sentence generating process according to the embodiment.

Next, the details of the suggested sentence generating process performed at step S1005 will be explained, with reference to FIG. 12.

First, the generating unit 114 specifies the source language input sentence S as a suggested sentence P to be displayed on the display device or the like (steps S1201). After that, the generating unit 114 obtains a piece of difference information that has not yet been processed out of the difference information list Ld (step S1202). Subsequently, the generating unit 114 combines the obtained piece of difference information with the suggested sentence P (step S1203). More specifically, the generating unit 114 combines the piece of difference information with the suggested sentence P by inserting the difference included in the piece of difference information into the corresponding position of the suggested sentence P, while placing the difference between the symbols "(" and ")". In this situation, in the case where the generating unit 114 inserts a plurality of differences into the same position, the generating unit 114 separates the inserted differences from one another by using the symbols "/".

Subsequently, the generating unit 114 judges whether all the pieces of difference information in the difference information list Ld have been processed (step S1204). In the case where all the pieces of difference information have not been processed (step S1204: No), the generating unit 114 selects the next piece of difference information and repeats the process (step S1202). On the contrary, in the case where all the pieces of difference information have been processed (step S1204: Yes), the suggested sentence generating process ends.

Figure 13:
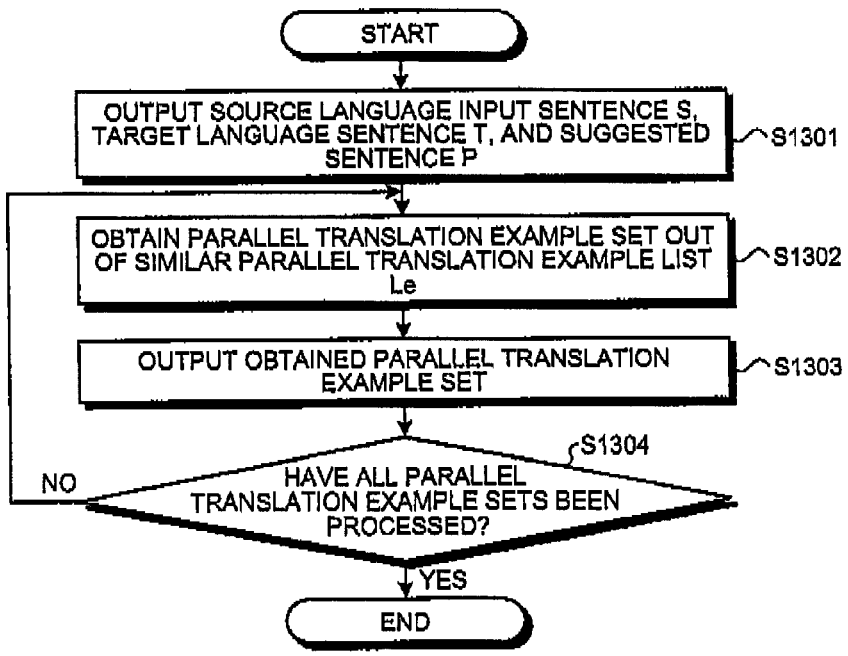
FIG. 13 is a flowchart of an overall procedure in a result outputting process according to the embodiment.

Next, the details of the result outputting process performed at step S1006 will be explained, with reference to FIG. 13.

First, the output unit 103 outputs the source language input sentence S, the target language sentence T, and the suggested sentence P in predetermined positions on the display screen (step S1301). After that, the output unit 103 obtains a parallel translation example set that has not yet been processed out of the similar parallel translation example list Le (step S1302). Subsequently, the output unit 103 outputs the obtained parallel translation example set into a predetermined position on the display screen (step S1303).

After that, the output unit 103 judges whether all the parallel translation example sets in the similar parallel translation example list Le have been processed (step S1304). In the case where all the parallel translation example sets have not been processed (step S1304: No), the output unit 103 selects the next parallel translation example set and repeats the process (step S1302). On the contrary, in the case where all the parallel translation example sets have been processed (step S1304: Yes), the result outputting process ends.

Figure 14:
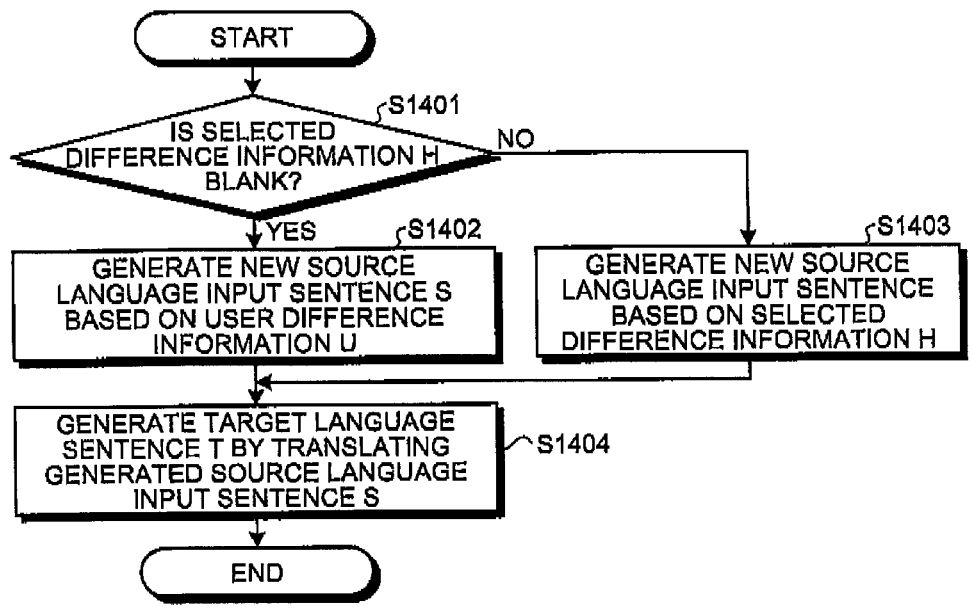
FIG. 14 is a flowchart of an overall procedure in a hypothesis applying process according to the embodiment.

Next, the details of the hypothesis applying process performed at step S1013 will be explained, with reference to FIG. 14.

First, the hypothesis applying unit 115 judges whether the selected difference information R is blank (step S1401). In the case where the selected difference information H is blank (step S1401: Yes), the hypothesis applying unit 115 generates a new source language input sentence S based on the user difference information U (step S1402). More specifically, the hypothesis applying unit 115 generates the new source language input sentence S by removing the symbols "(" and ")" from the user difference information U.

On the contrary, in the case where the selected difference information H is not blank (step S1401: No), the hypothesis applying unit 115 generates a new source language input sentence S based on the selected difference information H (step S1403).

After that, the hypothesis applying unit 115 generates a target language sentence T by causing the translating unit 112 to translate the newly generated source language input sentence S (step S1404), and the hypothesis applying process ends.

Figure 15:
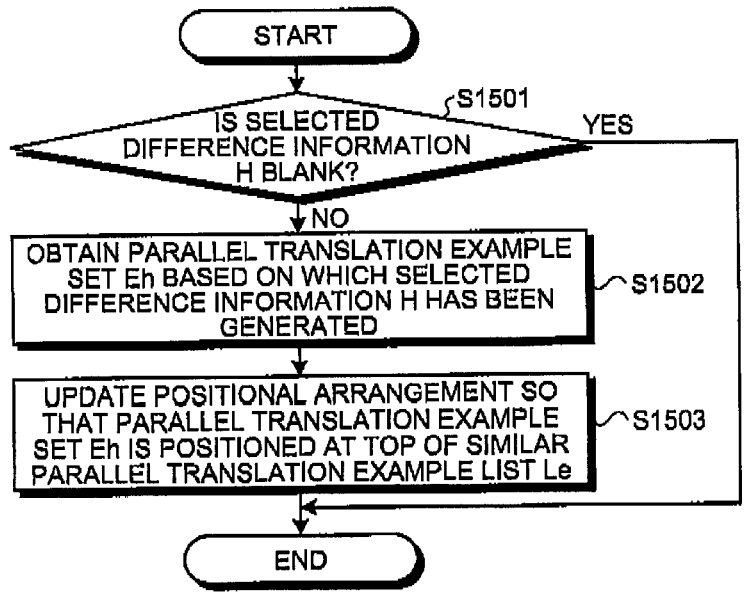
FIG. 15 is a flowchart of an overall procedure in an updating process according to the embodiment.

Next, the details of the updating process performed at step S1014 will be explained, with reference to FIG. 15.

First, the updating unit 116 judges whether the selected difference information H is blank (step S1501). In the case where the selected difference information H is blank (step S1501: Yes), the updating unit 116 ends the updating process.

On the contrary, in the case where the selected difference information H is not blank (step S1501: No), the updating unit 116 obtains a parallel translation example set Eh based on which the selected difference information H has been generated (step S1502). More specifically, the updating unit 116 obtains, out of the difference information list, the parallel translation example set Eh that is kept in correspondence with the piece of difference information matching the selected difference information H.

After that, the updating unit 116 updates the positional arrangement so that the obtained parallel translation example set Eh is positioned at the top of the similar parallel translation example list Le (step S1503), and the updating process ends.

Next, a specific example of the machine-translation process according to the present embodiment will be explained. In the following explanation, it is assumed that the example storage unit 120 stores therein the parallel translation example sets as shown in FIG. 2. It is also assumed that the source language is Japanese, and the specified target language is Chinese or English.

First, let us assume that the input receiving unit 101 has received the source language input sentence 401 as shown in FIG. 4 that has been input in Japanese to express the meaning of "I love to drink liquor" (step S1001). It should be noted that the verb "nomu" meaning "to drink" is omitted from the source language input sentence 401, as explained above.

Figure 16:
FIG. 16 is a drawing illustrating examples of translated sentences.

The searching unit 111 conducts a search in the example storage unit 120 for examples each of which is similar to the source language input sentence 401. As a result, the searching unit 111 obtains, for instance, the similar parallel translation example list Le as shown in FIG. 3 (step S1002). Also, the translating unit 112 generates, for example, a Chinese sentence 1601 or an English sentence 1602 as shown in FIG. 16 by translating the source language input sentence 401 (step S1003).

The Chinese sentence 1601 and the English sentence 1602 each have the meaning of "I love the substance called liquor". In other words, these translated sentences are unnatural translated sentences each of which has the meaning different from the user's intention, because the source language input sentence 401 from which the verb is omitted is directly translated without any adjustments.

To realize a translating process that properly reflects the intention of the user's utterance in such circumstances, the process is continued as described below: First, the detecting unit 113 performs the difference detecting process (step S1004).

For example, the detecting unit 113 obtains a reverse-translated input sentence Tb, which is the same as the source language input sentence 401, by causing the translating unit 112 to translate the target language sentence T, which is one of the Chinese sentence 1601 and the English sentence 1602, into the source language (step S1101).

The similar parallel translation example list Le stores therein the three parallel translation example sets as shown in FIG. 3. Thus, as a parallel translation example set E to serve as a target of the process, the detecting unit 113 extracts the parallel translation example set 301, which is listed at the top of the similar parallel translation example list Le (step S1102).

The difference between the example source sentence 304 included in the parallel translation example set 301 and the source language input sentence 401 are the Japanese word meaning "milk" and the Japanese word meaning "liquor". Thus, the detecting unit 113 generates an edited example translated sentence Em by replacing the word meaning "milk" used in either the example translated sentence 305 or the example translated sentence 306 included in the parallel translation example set 301 with the word meaning "liquor" (step S1104).

Figure 17:
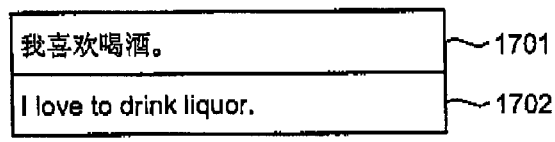
FIG. 17 is a drawing illustrating examples of edited example translated sentences.

FIG. 17 is a drawing illustrating examples of the edited example translated sentences that have been generated in the process described above. In the case where the target language is Chinese, a Chinese sentence 1701 shown in FIG. 17 is generated as the edited example translated sentence Em. On the other hand, in the case where the target language is English, an English sentence 1702 shown in FIG. 17 is generated as the edited example translated sentence Em.

The detecting unit 113 then generates an edited example reverse-translated sentence Et by causing the translating unit 112 to translate the generated edited example translated sentence Em into Japanese (step S1105). As a result, the edited example reverse-translated sentence Et in Japanese that includes the verb "nomu" meaning "to drink", which was omitted from the source language input sentence 401, is obtained.

After that, the detecting unit 113 detects the difference between the source language input sentence 401 and the edited example reverse-translated sentence Et and stores the detected difference into the difference information list Ld (step S1106). In the present example, the detecting unit 113 stores the difference information 601 as shown in FIG. 6, while the parallel translation example set 301 from which the difference has been detected is kept in correspondence with the difference information 601.

As a result of the processes described above, the difference detection process has been completed for the first parallel translation example set among the parallel translation example sets included in the similar parallel translation example list Le. After that, the processes described above are repeatedly performed for each of all the parallel translation example sets included in the similar parallel translation example list Le. As a result, the difference information list Ld as shown in FIG. 6 is generated.

Subsequently, the generating unit 114 performs the suggested sentence generating process (step S1005).

First, the generating unit 114 specifies the source language input sentence 401 as an initial value of a suggested sentence P (step S1201). After that, the generating unit 114 performs the processes described below to sequentially embed each of the pieces of difference information stored in the difference information list Ld into the suggested sentence P.

In the present example, the difference information list Ld stores therein the three pieces of difference information that are namely, as shown in FIG. 6, the difference information 601, 604, and 607. The generating unit 114 extracts the first piece of difference information (i.e., the difference information 601) from the difference information list Ld (step S1202). After that, the generating unit 114 embeds the difference 602 within the difference information 601 into the suggested sentence P (step S1203). At this stage, the generating unit 114 generates a suggested sentence that includes only the difference 702 within the suggested sentence 701 shown in FIG. 7, the difference 702 being placed between the symbols "(" and ")".

As a result of the processes described above, of the pieces of difference information included in the difference information list Ld, the suggested sentence generating process for the first piece of difference information has been completed. After that, the processes described above are repeatedly performed for each of all the pieces of difference information included in the difference information list Ld. As a result, the suggested sentence 701 as shown in FIG. 7 is generated.

Subsequently, the output unit 103 performs the result outputting process (step S1006). As a result of the result outputting process, the source language input sentence S, the target language sentence T, and the suggested sentence P that have been generated in the processes performed so far are output (step S1301). Also, the parallel translation example sets that are stored in the similar parallel translation example list Le are sequentially output according to the order in which they are arranged in the list (steps S1302 through S1303). In the present example, the output unit 103 outputs the source language input sentence S, the target language sentence T, the suggested sentence P, and the parallel translation example sets onto a display screen as shown in FIG. 9. As shown in FIG. 9, into the similar-parallel-translation example list field 904, the parallel translation example sets are output according to the order in which they are arranged in the list.

After that, let us assume that the user has selected the difference 702 from the suggested sentence 701 that has been presented, and the selection receiving unit 102 has received the user's selection (step S1007). The received operation is not an operation to end the process (step S1008: No), and the difference has been input (step S1009: Yes). Thus, the hypothesis applying unit 115 judges whether the input difference is included in the difference information list Ld (step S1010).

In the present example, the selected difference 702 matches the difference 602 included in the difference information 601 among the pieces of difference information included in the difference information list Ld shown in FIG. 6. Thus, the hypothesis applying unit 115 stores, into a storage unit, the difference information 601 as the selected difference information H and sets the user difference information U to be blank (step S1011).

After that, the hypothesis applying process is performed so that a translating process that properly reflects the intention of the user is performed based on the selected difference information that has been stored (step S1013).

The selected difference information H stores therein the difference information 601 shown in FIG. 6 (step S1401; No). Thus, the hypothesis applying unit 115 generates a new source language input sentence S based on the difference information 601 (step S1403). More specifically, the hypothesis applying unit 115 generates the new source language input sentence S by deleting the symbols "("0 and ")" from the difference information 601.

Subsequently, the hypothesis applying unit 115 generates a target language sentence T by causing the translating unit 112 to translate the newly generated source language input sentence S into the target language (step S1404). In the present example, for instance, the hypothesis applying unit 115 generates one of the Chinese sentence 1701 and the English sentence 1702 shown in FIG. 17 as the target language sentence T.

Each of these target language sentences is an expression that includes the action that is taken on the target object "liquor", unlike the Chinese sentence 1601 or the English sentence 1602 that has initially been obtained at step S1003. In other words, each of the target language sentences is a translated sentence that is equivalent to the contents of the source language input sentence intended by the user.

After that, the updating unit 116 performs the updating process (step S1014).

The selected difference information H stores therein the difference information 601 shown in FIG. 6 (step S1501: No). Thus, first, the updating unit 116 obtains the parallel translation example set Eh that is kept in correspondence with the selected difference information H (step S1502). The updating unit 116 then arranges the positional arrangement so that the obtained parallel translation example set Eh is positioned at the top of the similar parallel translation example list Le (step S1503). In the present example, because the parallel translation example set 301 in FIG. 3 positioned at the top of the list is kept in correspondence with the selected difference information H (cf. the parallel translation example set 603 shown in FIG. 6), the order in which the parallel translation example sets are arranged in the list does not change.

Figure 18:
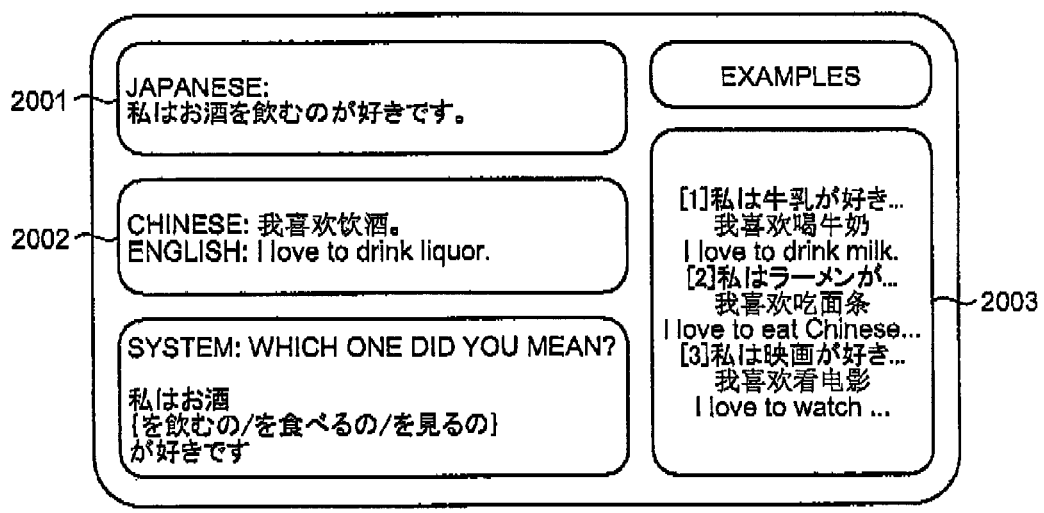
FIG. 18 is a drawing illustrating an example of a display screen.

As a result of the processes described above, the updating process has been completed, and the result outputting process is called again (step S1006). As a result, a display screen as shown in FIG. 18 is displayed. As shown in FIG. 18, into a source-language input sentence field 2001, the new source language input sentence with which it is possible to obtain a translated sentence that faithfully reflects the intention of the user's utterance is output. Also, into a target language sentence field 2002, a translated sentence obtained by translating the new source language input sentence is output. In the case where the order in which the parallel translation example sets are arranged in the similar parallel translation example list has been changed, the parallel translation example sets are output into a similar-parallel-translation example list field 2003 in the order after the change.

As a result of the processes described above, the result outputting process has been completed. When the user has input an operation to end the process (step S1008: Yes), the machine-translation process ends.

As explained above, according to the present embodiment, even if the user does not have sufficient knowledge of the target language, the user is able to find out, in the source language, the information that is needed by the machine-translation apparatus 100 to output a translated sentence that sufficiently reflects the intention of the user's utterance. Also, based on the information, the user is able to easily generate a source language input sentence from which a translated sentence that properly reflects the intention of the utterance can be generated. As a result, it is possible to realize the machine-translation apparatus 100 that achieves a high level of precision in the translating process.

Next, another specific example of the machine-translation process according to the present embodiment will be explained. In the following sections, an example of a process that is performed in the case where an output suggested sentence contains no information that properly reflects the user's intention, and the user therefore inputs, on his/her own, a word or a phrase with which the suggested sentence is to be supplemented will be explained.

In the following explanation, an example is used in which the input receiving unit 101 has received the source language input sentence 501 shown in FIG. 5 that has been input in Japanese to express the meaning of "Don't forget to put a stamp" (step S1001). As explained above, the verb "haru" meaning "to put" is omitted from the source language input sentence 501.

The searching unit 111 conducts a search in the example storage unit 120 for examples each of which is similar to the source language input sentence 501 and obtains, for instance, a similar parallel translation example list Le shown in FIG. 19 (step S1002). Also, the translating unit 112 generates, for instance, one of a Chinese sentence 2201 and an English sentence 2202 shown in FIG. 20 by translating the source language input sentence 501 (step S1003).

The Chinese sentence 2201 and the English sentence 2202 shown in FIG. 20 each have the meaning of "Don't forget to buy a (or one) stamp". In other words, each of these translated sentences is supplemented with the action "to buy", which is different from the user's intention.

To realize a translating process that properly reflects the intention of the user's utterance in such circumstances, the process is continued as described below. The processes from the difference detecting process through the result outputting process (steps S1004 through S1006) are the same as those described above. Thus, detailed explanation thereof will be omitted.

FIG. 21 is a drawing illustrating an example of the difference information list Ld that is generated as a result of the difference detecting process in the present example. FIG. 22 is a drawing illustrating an example of the display screen that is output as a result of the result outputting process in the present example. As shown in FIGS. 21 and 22, in the present example, no parallel translation example set containing the verb that means "to put", which is intended by the user, has been found in the search. Thus, no suggested sentence containing the verb that means "to put" is displayed. However, based on the displayed suggested sentence, the user is able to speculate that it is possible to obtain an appropriate translated sentence by supplementing the input sentence with the verb.

Let us assume that, after the result outputting process has been completed, the user has input a Japanese word so as to supplement the sentence with the verb meaning "to put", although the difference is not included in any of the presented suggested sentences (step S1007).

The operation is not an operation to end the process (step S1008: No), and the difference has been input (step S1009: Yes). Thus, the hypothesis applying unit 115 judges whether the input difference is included in the difference information list Ld (step S1010).

In the present example, the input difference is not included in the difference information list Ld (step S1010: No). Thus, the hypothesis applying unit 115 generates user difference information U that includes the input difference, stores the generated user difference information U into a storage unit, and sets the selected difference information H to be blank (step S1012). The user difference information 801 shown in FIG. 8 represents the user difference information generated in the present example.

After that, the hypothesis applying process is performed so that a translating process that properly reflects the user's intention can be performed based on the stored user difference information 801 (step S1013).

In the present example, because the selected difference information H is blank (step S1401: Yes), the hypothesis applying unit 115 generates a new source language input sentence S based on the user difference information 801 (step 51403). More specifically, the hypothesis applying unit 115 generates the new source language input sentence S by deleting the symbols "(" and ")" from the user difference information 801.

Subsequently, the hypothesis applying unit 115 generates a target language sentence T by causing the translating unit 112 to translate the newly generated source language input sentence S into the target language (step S1404). In the present example, one of a Chinese sentence 2203 and an English sentence 2204 that are shown in FIG. 20 is generated as the target language sentence T. The Chinese sentence 2203 and the English sentence 2204 shown in FIG. 20 are each a translated sentence that is supplemented with the action "to put", which was intended by the user.

After that, the updating unit 116 performs the updating process (step S1014).

In the present example, the selected difference information H is blank (step S1501: Yes). Thus, the updating unit 116 performs the updating process without updating the positional arrangement in the similar parallel translation example list Le.

Figure 23:
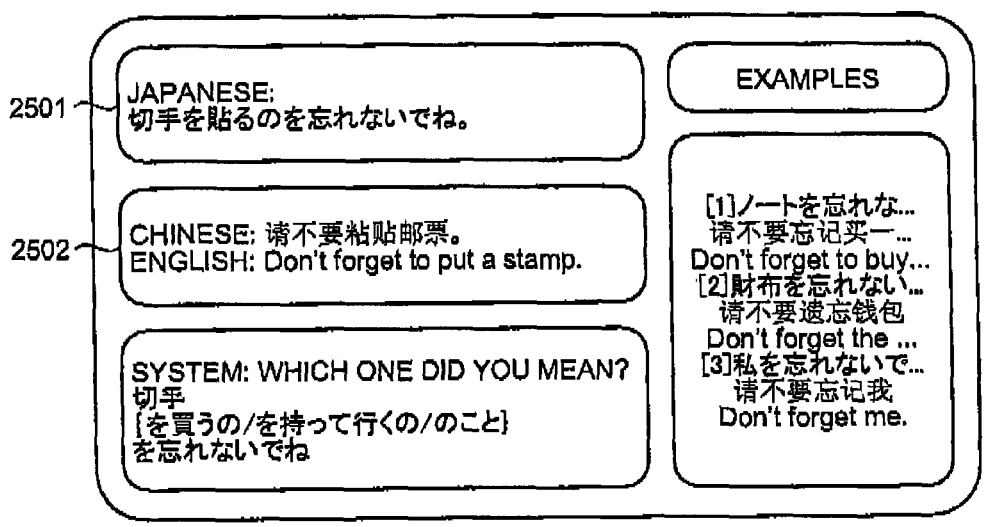
FIG. 23 is a drawing illustrating another example of a display screen.

As a result of the processes described above, the updating process has been completed, and the result outputting process is called again (step S1006). As a result, a display screen as shown in FIG. 23 is displayed. As shown in FIG. 23, into a source-language input sentence field 2501, the new source language input sentence with which it is possible to obtain a translated sentence that faithfully reflects the intention of the user's utterance is output. Also, into a target language sentence field 2502, a translated sentence that has been obtained by translating the new source language input sentence is output.

As explained above, even if the user does not have sufficient knowledge of the target language, the user is able to speculate the information that is needed by the machine-translation apparatus to output a translated sentence that sufficiently reflects the intention of the user's utterance, by referring to the examples of similar utterances and the information of the missing words or phrases that are appended to the suggested sentences. Thus, the user is able to easily perform the operation to correct the source language input sentence.

In the embodiment described above, the updating unit 116 moves the parallel translation example set from which the selected difference has been generated to the top of the similar parallel translation example list, so that the parallel translation example set is displayed on the display screen with a higher priority. In addition to this arrangement, another arrangement is acceptable in which the parallel translation example set from which the selected difference has been generated will be given a higher priority in the example searching process that is performed thereafter.

In this situation, the example storage unit 120 is configured so as to store therein priority levels indicating the degrees with which the parallel translation example sets are prioritized, in correspondence with the parallel translation example sets. In the case where parallel translation example sets having mutually the same similarity level have been found in the search, the searching unit 111 conducts a search by giving a higher priority to the parallel translation example sets having higher priority levels. Further, the updating unit 116 raises, by a predetermined value, the priority level assigned to the parallel translation example set from which the selected difference has been generated.

With these arrangements, it is possible to find more appropriate parallel translation example sets, to detect appropriate differences out of the parallel translation example sets that have been found in the search, and to present the detected differences to the user.

In the embodiment described above, the example is explained in which both of the following processes are performed: the process to detect the difference by comparing the source language input sentence with the edited example reverse-translated sentence (e.g., step S1106); and the process to detect the difference by comparing the reverse-translated input sentence with the edited example reverse-translated sentence (e.g., step S1107). However, the method used for detecting the differences is not limited to this example. Another arrangement is acceptable in which the differences are detected by performing one of the two processes above.

In the embodiment described above, the detected difference is output while being included in the suggested sentence, and further, the translated sentence that properly reflects the user's intention is obtained by re-translating the source language input sentence that is newly generated based on the difference that has been selected by the user out of the suggested sentence. However, the method for outputting the difference is not limited to the one in this example. It is acceptable to employ any other method, as long as the method implies that it is possible to generate a translated sentence that properly reflects the user's intention by, at least, being supplemented with the difference. For example, an arrangement is acceptable in which only the differences are output in the form of a list. Further, the method for performing the re-translating process is not limited to the one in the example described above. For example, another arrangement is acceptable in which the machine-translation apparatus receives a new source language input sentence that has been re-input by the user by referring to the output difference and translates the received sentence.

In the specific example described above, if we assume that, after the result outputting process at step S1006 has been completed, the user has input the Japanese word to supplement the sentence with the verb meaning "to buy", this process has the same meaning as accepting, without any adjustments, the unchanged sentence of the reverse-translated input sentence, i.e., the result of the translation of the source language input sentence received at step S1001. As explained here, by performing the difference comparison process to compare the reverse-translated input sentence and the example source sentence, it is possible to confirm that the translation result output by the machine-translation apparatus is a result that faithfully matches the user's intention.

As explained above, when the machine-translation apparatus according to the present embodiment is used, it is possible to conduct a search for a parallel translation example set including an example that is similar, to the input sentence in the source language, to detect the difference by comparing the reverse-translated sentence obtained by translating the target language example included in the parallel translation example set into the source language with the input sentence or with another reverse-translated sentence obtained by translating the result of the translation of the input sentence into the target language further into the source language, and to output the detected difference for the user.

In other words, by utilizing the example-based information in which the translation examples are accumulated, it is possible to speculate the speaker's intention as the information that is required during the translating process, the speaker's intention being rarely reflected in the target language sentence as long as only the superficial information of the source language sentence is faithfully translated. It is also possible to present such information to the user so as to prompt the user to input additional information. As a result, it is possible to avoid the situation in which the target language speaker receives some contents that are different from the intention of the user (i.e., the source language speaker).

Figure 24:
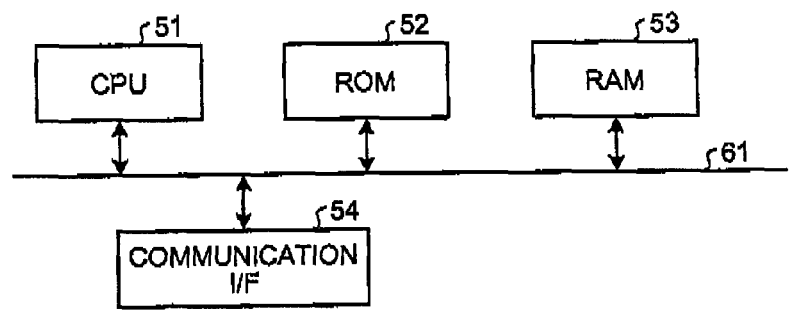
FIG. 24 is a drawing for explaining a hardware configuration of a machine-translation apparatus according to the embodiment.

Next, a hardware configuration of the machine-translation apparatus according to the present embodiment will be explained, with reference to FIG. 24.

The machine-translation apparatus according to the present embodiment includes a control device such as a Central Processing Unit (CPU) 51; storage devices such as a Read Only Memory (ROM) 52 and a Random Access Memory (RAM) 53; a communication interface (I/F) 54 that establishes a connection to a network and performs communication; external storage devices such as a Hard Disk Drive (HDD) and a Compact Disk (CD) Drive Device; a display device; input devices such as a keyboard and a mouse; and a bus 61 that connects these constituent elements to one another. The machine-translation apparatus has a hardware configuration for which a commonly-used computer can be used.

A machine-translation computer program (hereinafter the "machine-translation program") that is executed by the machine-translation apparatus according to the present embodiment is provided as being recorded on a computer-readable recording medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format.

Another arrangement is acceptable in which the machine-translation program executed by the machine-translation apparatus according to the present embodiment is stored in a computer connected to a network like the Internet, so that the machine-translation program is provided as being downloaded via the network. Yet another arrangement is acceptable in which the machine-translation program executed by the machine-translation apparatus according to the present embodiment is provided or distributed via a network like the Internet.

Further, yet another arrangement is acceptable in which the machine-translation program according to the present embodiment is provided as being incorporated in a ROM or the like in advance.

The machine-translation program executed by the machine-translation apparatus according to the present embodiment has a module configuration that includes the functional units described above (e.g., the input receiving unit, the selection receiving unit, the translation controlling unit, and the output unit). As the actual hardware configuration, these functional units are loaded into a main storage device when the CPU 51 (i.e., the processor) reads and executes the machine-translation program from the storage device described above, so that these functional units are generated in the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine-translation apparatus comprising:
    an example storage unit that stores target language examples in a target language and source language examples in a source language in correspondence with one another, each of the target language examples having a meaning equivalent to a meaning of a corresponding one of the source language examples;
    an input receiving unit that receives an input sentence in the source language;
    a searching unit that conducts a search in the example storage unit for one of the target language examples corresponding to one of the source language examples that either matches or is similar to the input sentence;
    a translating unit that generates, using a processor, a reverse-translated sentence by translating the one of the target language examples found in the search into the source language;
    a detecting unit that detects difference portions between the reverse-translated sentence and the input sentence;
    a generating unit that generates an output sentence by adding the difference portions to the input sentence;
    an output unit that outputs, to a user, the output sentence to which the difference portions are added; and
    a selection receiving unit that receives a selection of one of the output difference portions,
    wherein;
        the translating unit further generates a target language sentence by translating a combination of the input sentence and the selected one of the difference portions, and
        the output unit further outputs the target language sentence.

2. The apparatus according to claim 1, wherein
    the example storage unit further stores priority levels in correspondence with the target language examples, the priority levels indicating degrees with which the target language examples are prioritized, respectively, the searching unit conducts a search by giving a higher priority to some of the target language examples having higher priority levels than other target language examples having lower priority levels, and
    the apparatus further comprises an updating unit that raises, by a predetermined value, the priority level of the target language example from which the reverse-translated sentence containing the selected difference portion are generated.

3. The apparatus according to claim 1, wherein
    the input receiving unit further receives an input of one or more words to be added to the input sentence,
    the translating unit further generates the target language sentence by translating the input sentence to which the received one or more words are added into the target language, and
    the output unit further outputs the target language sentence.

4. The apparatus according to claim 1, wherein
    the example storage unit stores the target language examples and the source language examples in correspondence with one another, one or more words contained in a corresponding one of the target language examples being omissible from each of the source language examples, and
    the detecting unit detects, as one of the difference portions, the one or more words omitted from the one of the source language examples that either matches or is similar to the input sentence.

5. The apparatus according to claim 1, wherein:
    each of the output difference portions is placed between a pair of non-alphabetic symbols.

6. A machine-translation apparatus comprising:
    an example storage unit that stores target language examples in a target language and source language examples in a source language in correspondence with one another, each of the target language examples having a meaning equivalent to a meaning of a corresponding one of the source language examples;
    an input receiving unit that receives an input sentence in the source language;
    a searching unit that conducts a search in the example storage unit for one of the target language examples corresponding to one of the source language examples that either matches or is similar to the input sentence;
    a first translating unit that generates a first reverse-translated sentence by translating the one of the target language examples found in the search into the source language;
    a second translating unit that generates, using a processor, a target language sentence by translating the input sentence into the target language, and generates a second reverse-translated sentence by translating the generated target language sentence into the source language;
    a detecting unit that detects a difference portion between the first reverse-translated sentence and the second reverse-translated sentence;
    a generating unit that generates an output sentence by adding the difference portions to the input sentence
    an output unit that outputs, to a user, the output sentence to which the difference portions are added; and a selection receiving unit that receives a selection of one of the output difference portions, wherein:

the translating unit further generates the target language sentence by translating a combination of the input sentence and the selected one of the difference portions, and the output further outputs the target language sentence.

7. The apparatus according to claim 6, wherein:

each of the output difference portions is placed between a pair of non-alphabetic symbols.

8. The apparatus according to claim 6, wherein the example storage unit further stores priority levels in correspondence with the target language examples, the priority levels indicating degrees with which the target language examples are prioritized, respectively, the searching unit conducts a search by giving a higher priority to some of the target language examples having higher priority levels than other target language examples having lower priority levels, and the apparatus further comprises an updating unit that raises, by a predetermined value, the priority level of the target language example from which the reverse-translated sentence containing the selected difference portion are generated.

9. The apparatus according to claim 6, wherein the input receiving unit further receives an input of one or more words to be added to the input sentence, the second translating unit further generates the target language sentence by translating the input sentence to which the received one or more words are added into the target language, and the output unit further outputs the target language sentence.

10. The apparatus according to claim 6, wherein the example storage unit stores the target language examples and the source language examples in correspondence with one another, one or more words contained in a corresponding one of the target language examples being capable of omissible from each of the source language examples, and the detecting unit detects, as one of the difference portions, the one or more words omitted from the one of the source language examples that either matches or is similar to the input sentence.

11. A machine-translation method comprising:

receiving an input sentence in a source language;

conducting a search in an example storage unit that stores target language examples in a target language and source language examples in the source language in correspondence with one another, each of the target language examples having a meaning equivalent to a meaning of a corresponding one of the source language examples, for one of the target language examples corresponding to one of the source language examples that either matches or is similar to the input sentence;

generating, using a processor, a reverse-translated sentence by translating the one of the target language examples found in the search into the source language detecting a difference portion between the reverse-translated sentence and the input sentence; and generating an output sentence by adding the difference portions to the input sentence;

outputting, to a user, the output sentence to which the difference portions are added;

receiving a selection of one of the output difference portions in the output sentence;

generating a target language sentence by translating a combination of the input sentence and the selected one of the difference portions; and outputting the target language sentence.

12. A machine-translation method comprising;

receiving an input sentence in a source language;

conducting a search in an example storage unit that stores target language examples in a target language and source language examples in the source language in correspondence with one another, each of the target language examples having a meaning equivalent to a meaning of a corresponding one of the source language examples, for one of the target language examples corresponding to one of the source language examples that either matches or is similar to the input sentence;

generating a first reverse-translated sentence by translating the one of the target language examples found in the search into the source language;

generating, using a processor, a target language sentence by translating the input sentence into the target language and generating a second reverse-translated sentence by translating the generated target language sentence into the source language;

detecting a difference portion between the first reverse-translated sentence and the second reverse-translated sentence;

generating an output sentence by adding the difference portions to the input sentence;

outputting, to a user, the output sentence to which the difference portions are added;

receiving a selection of one of the output difference portions in the output sentence;

generating the target language sentence by translating a combinations of the input sentence and the selected one of the difference portions; and outputting the target language sentence.

* * * * *